(12) United States Patent
Roberge

(10) Patent No.: US 9,932,902 B2
(45) Date of Patent: Apr. 3, 2018

(54) TURBINE SECTION SUPPORT FOR A GAS TURBINE ENGINE

(71) Applicant: United Technologies Corporation, Hartford, CT (US)

(72) Inventor: Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 452 days.

(21) Appl. No.: 14/797,253

(22) Filed: Jul. 13, 2015

(65) Prior Publication Data
US 2016/0195019 A1    Jul. 7, 2016

Related U.S. Application Data

(60) Provisional application No. 62/024,636, filed on Jul. 15, 2014.

(51) Int. Cl.
*F02C 7/20* (2006.01)
*F01D 25/16* (2006.01)
(Continued)

(52) U.S. Cl.
CPC ............... *F02C 7/20* (2013.01); *F01D 25/16* (2013.01); *F01D 25/162* (2013.01); *F02C 3/04* (2013.01); *F02C 7/06* (2013.01); *F05D 2220/32* (2013.01); *F05D 2230/60* (2013.01); *F05D 2240/24* (2013.01); *F05D 2240/50* (2013.01); *F05D 2240/54* (2013.01); *F05D 2240/60* (2013.01);
(Continued)

(58) Field of Classification Search
CPC .... F02C 7/06; F02C 7/20; F01D 25/16; F01D 25/162; F05D 2240/50; F05D 2240/54; F05D 2250/36
See application file for complete search history.

(56) References Cited

U.S. PATENT DOCUMENTS 3,491,536 A    1/1970  Hadaway
3,526,092 A  * 9/1970  Steel ..................... F01D 25/16
                                                        415/60
(Continued)

FOREIGN PATENT DOCUMENTS

FR          2394706        1/1979

OTHER PUBLICATIONS

Extended European Search Report for Application No. 15176919.7 dated Dec. 7, 2015.

*Primary Examiner* — Ehud Gartenberg
*Assistant Examiner* — James McGlynn
(74) *Attorney, Agent, or Firm* — Carlson, Gaskey & Olds, P.C.

(57) ABSTRACT

A gas turbine engine includes a compressor portion, a combustor fluidly connected to the compressor portion via a primary flowpath, and a turbine portion fluidly connected to the combustor via the primary flowpath. The turbine section includes a first turbine portion and a second turbine portion. The second turbine portion is at a low pressure relative to the first turbine portion. A first turbine shaft is supported relative to a second turbine shaft by a first bearing, the first bearing having an inner diameter and an outer diameter, with the inner diameter of the first bearing being connected to one of the first shaft and the second shaft and the outer diameter of the first bearing being connected to the other of the first shaft and the second shaft.

12 Claims, 8 Drawing Sheets

(51) Int. Cl.
  *F02C 7/06*    (2006.01)
  *F02C 3/04*    (2006.01)
  *F16C 35/06*    (2006.01)
  *F16C 19/55*    (2006.01)

(52) U.S. Cl.
  CPC .......... *F05D 2250/36* (2013.01); *F16C 19/55* (2013.01); *F16C 35/06* (2013.01)

(56) References Cited

U.S. PATENT DOCUMENTS

| | | | |
|---|---|---|---|
| 3,756,672 A | | 9/1973 | Hibner et al. |
| 3,900,270 A | * | 8/1975 | Rhodes .................. F01D 5/026 403/317 |
| 4,979,872 A | * | 12/1990 | Myers ..................... F01D 9/065 403/131 |
| 5,809,772 A | | 9/1998 | Giffin, III et al. |
| 6,711,887 B2 | | 3/2004 | Orlando et al. |
| 7,246,484 B2 | | 7/2007 | Giffin, III et al. |
| 8,215,901 B2 | * | 7/2012 | Kapustka ............. F01D 25/162 415/142 |
| 2013/0025257 A1 | * | 1/2013 | Suciu ........................ F02C 7/06 60/226.1 |
| 2013/0192265 A1 | | 8/2013 | Schwarz et al. |
| 2015/0125293 A1 | * | 5/2015 | Sheridan ................ F02C 3/107 415/229 |

\* cited by examiner

TURBINE SECTION SUPPORT FOR A GAS TURBINE ENGINE

CROSS-REFERENCE TO RELATED APPLICATION

This application claims priority to U.S. Provisional Application No. 62/024,636 filed on Jul. 15, 2014.

TECHNICAL FIELD

The present disclosure relates generally turbine portions of gas turbine engines, and more specifically to a structural rotor support system for the same.

BACKGROUND

Gas turbine engines for use in commercial aircraft include a compressor portion that compresses air and provides the compressed air to a combustor portion along a primary fluid flowpath. The combustor receives fuel from an aircraft fuel system and ignites a mixture of fuel and compressed air. The combustion gasses resultant from the combustion are passed through a turbine portion of the gas turbine engine, and drive the stages within the turbine portion to rotate. Each of the stages is connected to a shaft, and rotation of the turbine stages in turn drives rotation of the shaft.

The turbine portion is divided into at least two sequential turbine sections, with combustion gasses flowing through the second turbine section being at a lower pressure than combustion gasses flowing through the first turbine section. The first turbine section is connected to a first shaft and drives at least a high pressure section of the compressor portion. The second turbine section is connected to a second shaft and drives at least a low pressure section of the compressor portion. The second shaft is positioned radially inward of the first shaft.

In order to structurally support each shaft relative to the other shaft, support the rotor system, and support an engine case relative to each of the shafts, multiple structural supports and bearings are located in the gas turbine engine and provide support.

SUMMARY OF THE INVENTION

In one exemplary embodiment of the disclosure, a gas turbine engine includes a compressor portion, a combustor fluidly connected to the compressor portion via a primary flowpath, a turbine portion fluidly connected to the combustor via the primary flowpath, wherein the turbine portion includes at least a first turbine section and a second turbine section, the second turbine portion being at a low pressure relative to the first turbine portion, a first shaft connected to the first turbine section, a second shaft radially inward of the first shaft and connected to the second turbine section, and wherein the first shaft is supported relative to the second shaft by a first bearing, the first bearing having an inner diameter and an outer diameter, with the inner diameter of the first bearing being connected to one of the first shaft and the second shaft and the outer diameter of the first bearing being connected to the other of the first shaft and the second shaft.

In a further example of the preceding gas turbine engine, the outer diameter of the first bearing is connected to an extension arm of the second shaft, and the inner diameter of the first bearing is directly connected to the first shaft.

In a further example of any of the preceding gas turbine engines, the inner diameter of the first bearing is connected directly to the first shaft and the outer diameter of the first bearing is connected directly to the second shaft.

A further example of any of the preceding gas turbine engines includes a static support structure disposed partially within a transitional duct in the primary flowpath between the first turbine portion and the second turbine portion, wherein the static support structure structurally supports an outer diameter of the primary flowpath relative to the second shaft.

In a further example of any of the preceding gas turbine engines, the static support structure is connected to the second shaft via a second bearing, and wherein the static support structure includes an overhang region positioned radially outward of the first bearing.

In a further example of any of the preceding gas turbine engines, the static support structure includes an extension region extending aft of the second bearing, and wherein the static support structure is further supported relative to the second shaft via a third bearing connecting the extension region to the second shaft.

In a further example of any of the preceding gas turbine engines, the static support structure is further supported relative to the second shaft by a second bearing connecting a radially inward facing surface of the overhang region to an extension arm of the second shaft.

In a further example of any of the preceding gas turbine engines, the first bearing and the second bearing at least partially axially overlap.

In a further example of any of the preceding gas turbine engines, the turbine portion is characterized by a lack of flow correcting vanes in a transitional duct connecting the first turbine portion and the second turbine portion.

In a further example of any of the preceding gas turbine engines, the first turbine section includes a plurality of turbine rotors, and wherein each of the plurality of turbine rotors is supported relative to the second shaft via the first bearing arrangement, through the first shaft.

A further example of any of the preceding gas turbine engines includes a turbine case extension connected to a fluid output of the turbine portion and supported relative to the second shaft by a fourth bearing.

A further example of any of the preceding gas turbine engines includes a static support structure disposed between a first stage and a second stage of the second turbine section.

In one example, a method for providing structural support in a turbine section of a gas turbine engine includes connecting a first shaft to a second shaft via a first bearing, thereby supporting the first shaft relative to the second shaft, supporting a plurality of turbine rotors by connecting the plurality of turbine rotors to the first shaft, and supporting an outer diameter of a primary flowpath of the gas turbine engine relative to the second shaft by directly connecting a radially outward portion of a static support structure to an outer diameter of the primary flowpath and connecting a radially inward portion of the static support structure to the second shaft via at least a second bearing.

In a further example of the preceding method, supporting the outer diameter of the primary flowpath of the gas turbine engine relative to the second shaft by directly connecting the radially outward portion of the static support structure to the outer diameter of the primary flowpath and connecting the radially inward portion of the static support structure to the second shaft via at least one bearing further comprises placing an overhang region of the static support structure such that a radially inward facing surface of the overhang region is immediately radially outward of the first bearing.

In a further example of the preceding method, supporting an outer diameter of a primary flowpath of the gas turbine engine relative to the second shaft by directly connecting a radially outward portion of a static support structure to an outer diameter of the primary flowpath and connecting a radially inward portion of the static support structure to the second shaft via at least a second bearing further comprises supporting the static support structure relative to the second shaft via connecting the radially inward portion of the static support structure to the second shaft using a second bearing and a third bearing, and wherein each of the second bearing and the third bearing are aft of the first bearing.

In a further example of the preceding method, supporting an outer diameter of a primary flowpath of the gas turbine engine relative to the second shaft by directly connecting a radially outward portion of a static support structure to an outer diameter of the primary flowpath and connecting a radially inward portion of the static support structure to the second shaft via at least a second bearing further comprises connecting the radially inward facing surface of the overhang region to an extension arm of the second shaft via a third bearing.

In a further example of the preceding method, the third bearing and the first bearing at least partially axially overlap.

In one exemplary embodiment of the disclosure, a gas turbine engine includes a compressor portion, a combustor fluidly connected to the compressor portion via a primary flowpath, a turbine portion fluidly connected to the combustor via the primary flowpath, wherein the turbine portion includes at least a first turbine section and a second turbine section, the second turbine portion being at a low pressure relative to the first turbine portion, a first shaft connected to the first turbine section, a second shaft radially inward of the first shaft and connected to and structurally supporting the second turbine section, and wherein the second shaft is a multi-part shaft having a first shaft portion and a second shaft portion, the first shaft portion and the second shaft portion being joined at a shaft joint.

In a further example of any of the preceding gas turbine engines, the first shaft is supported relative to the second shaft by a first bearing, the first bearing having an inner diameter and an outer diameter, with the inner diameter of the first bearing being connected to one of the first shaft and the second shaft and the outer diameter of the first bearing being connected to the other of the first shaft and the second shaft.

A further embodiment of any of the previous gas turbine engines includes a static support structure supporting an outer diameter of the primary flowpath, wherein a radially outward portion of the static support structure is connected to the outer diameter of the primary flowpath, a radially inward portion of the static support structure is connected to the second shaft via a bearing, and wherein the static support structure includes an overhang region having a radially inward facing surface disposed immediately radially outward of the shaft joint.

These and other features of the present invention can be best understood from the following specification and drawings, the following of which is a brief description.

DETAILED DESCRIPTION OF AN EMBODIMENT

Figure 1:
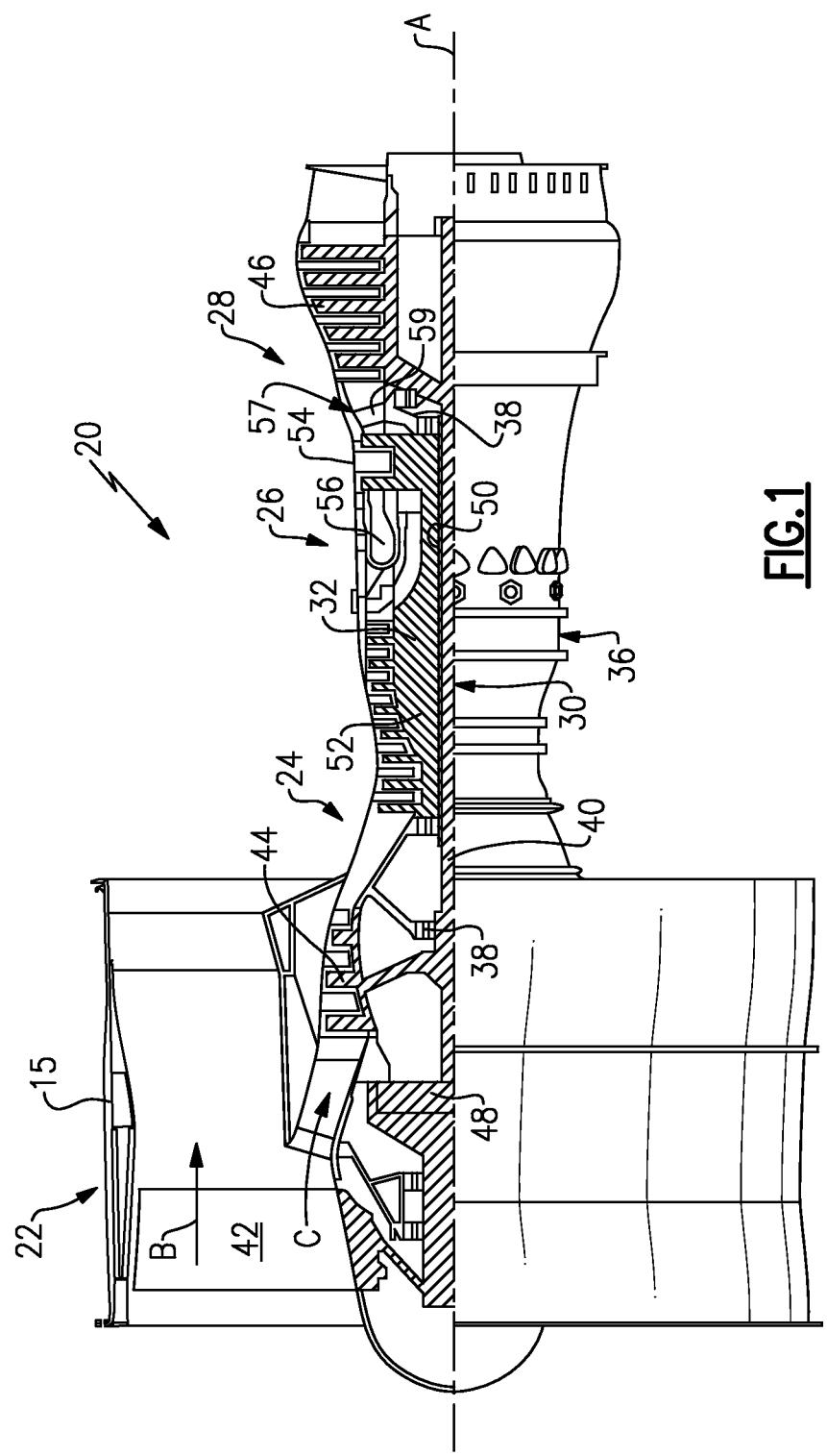
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor portion 24, a combustor section 26 and a turbine portion 28. Alternative engines might include an augmentor section (not shown) among other systems or features. The fan section 22 drives air along a bypass flow path B in a bypass duct defined within a nacelle 15, while the compressor portion 24 drives air along a core flow path C for compression and communication into the combustor section 26 then expansion through the turbine portion 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static support structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static support structure 36 is arranged generally between the high pressure turbine 54 and the low pressure turbine 46. The mid-turbine frame 57 further supports bearing systems 38 in the turbine portion 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor portion 24, combustor section 26, turbine portion 28, and fan drive gear system 48 may be varied. For example, gear system 48 may be located aft of combustor section 26 or even aft of turbine portion 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2A:
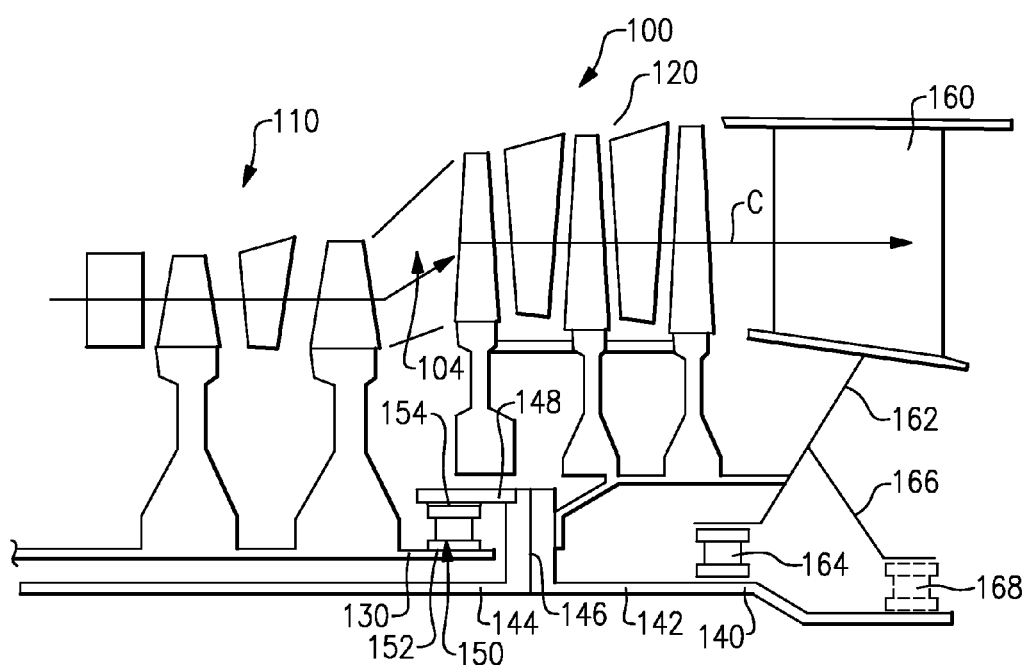
FIG. 2A schematically illustrates a first example turbine portion for a gas turbine engine.
Figure 2B:
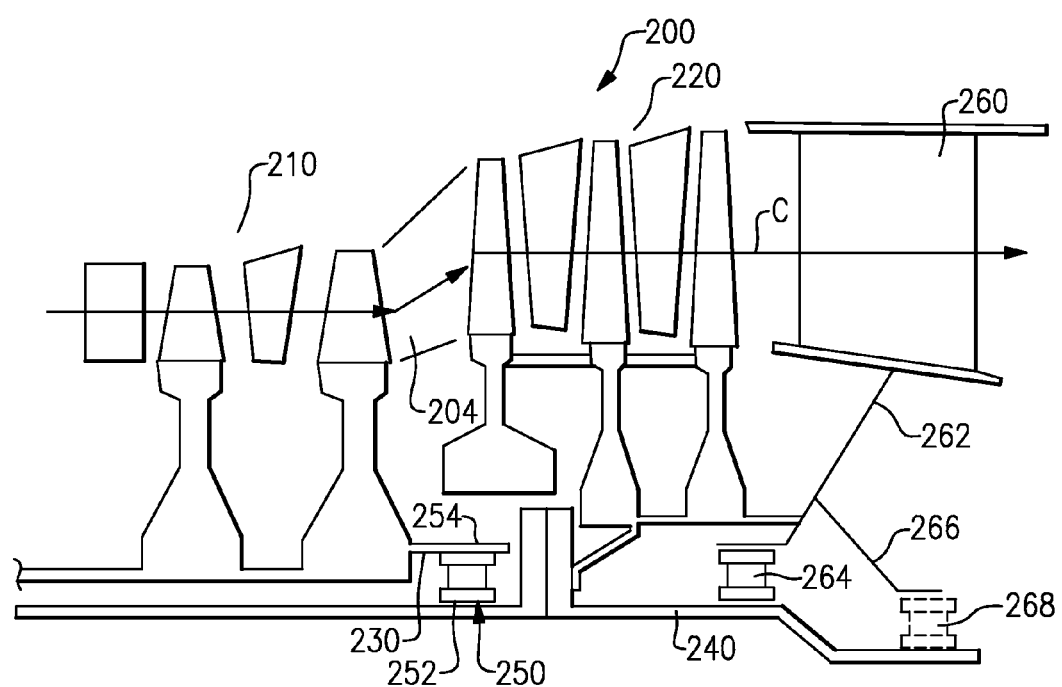
FIG. 2B schematically illustrates a second example turbine portion for a gas turbine engine.

FIGS. 2A and 2B each schematically illustrate a turbine portion 100, 200 for a gas turbine engine, such as the gas turbine engine 20 illustrated in FIG. 1. The turbine portions 100, 200 each include a first turbine section 110, 210 and a second turbine section 120, 220. In the exemplary embodiments, there are no flow correcting vanes in a transitional duct 104, 204 separating and connecting the first turbine section 110, 210 and the second turbine section 120, 220. In alternative embodiments, the transitional ducts 104, 204 can include flow correcting vanes. The first turbine section 110, 210 is connected to a first shaft 130, 230 and combustion gas passing through the primary flowpath C in the first turbine section 110, 210 is at a high pressure relative to fluid passing through the second turbine section 120, 220. Similarly, the second turbine section 120, 220 is connected to a second shaft 140, 240. The second shaft 140, 240 is a multi-part shaft including a first section 142, 242 and a second section 144, 244 joined at a mechanically connected shaft joint 146, 246. In order to maintain the relative positions of the first shaft 130, 230 and the second shaft 140, 240 and support the rotors in the first turbine section 110, 210, an intershaft roller bearing 150, 250 is placed between the shafts 130, 140, 230, 240 and contacts both shafts 130, 140, 230, 240.

Referring now to the example of FIG. 2A, the bearing 150 includes an inner diameter race 152 and an outer diameter race 154. The inner diameter race 152 of the bearing 150 is connected to the first shaft 130, and the outer diameter race 154 of the bearing 150 is connected to an extension hub 148 of the joint 146. The bearing positioning maintains a radial clearance between the first shaft 130 and the second shaft 140 through the use of rolling elements to transmit radial load, while simultaneously allowing the first shaft 130, and the second shaft 140 to rotate independently. The bearing 150 further supports the rotors connected to the first shaft 130, 230.

Referring now to the example of FIG. 2B, the bearing 250 includes an inner diameter race 252 and an outer diameter race 254. In contrast to the bearing connections illustrated in the example of FIG. 2A, the bearing 250 of FIG. 2B is connected to the first shaft 230 on the outer diameter 254 of the bearing and is connected directly to the second shaft 240 on the inner diameter 252. Because the bearing 250 is connected to the second shaft 240 at the inner diameter 252, the bearing 250 can be directly connected to the second shaft 240 and is not connected through an extension hub.

Referring again to both the examples of FIGS. 2A and 2B, a turbine exhaust case 160, 260 is positioned downstream of the second turbine section 120, 220 and directs turbine exhaust out of the gas turbine engine 20. The turbine exhaust case 160, 260 is structurally supported relative to the second shaft 240 via a structural bearing support 162, 262 and a bearing 164, 264. In examples where a single bearing 164, 264 and bearing support 162, 262 is insufficient to structurally support the turbine exhaust case 160, 260, an optional secondary bearing support 166, 266 and secondary support bearing 168, 268 can be used as well.

In some example engines, the turbine portion can require additional structural support to reduce the axial span between bearings for improved shaft dynamics or for management of turbine rotor blade tip clearances. In such cases a static support structure can be incorporated into the turbine portion of the gas turbine engine.

With continued reference to FIG. 1, FIGS. 3A, 3B and 3C illustrate turbine portions 300, 400, 500 including a static support structure 370, 470, 570. The static support structure 370, 470, 570 can alternately be referred to as a mid-turbine frame. As with the example turbine portions 100, 200 of FIGS. 2A and 2B, the turbine portions 300, 400, 500 each include a first turbine section 310, 410, 510 and a second turbine section 320, 420, 520. The first turbine section 310, 410, 510 is connected to a first shaft 330, 430, 530 and fluid passing through the primary flowpath C in the first turbine section 310, 410, 510 is at a high pressure and temperature relative to fluid passing through the second turbine section 320, 420, 520. Similarly, the second turbine section 320, 420, 520 is mechanically connected by a spline or other means to a second shaft 340, 440, 540. The second shaft 340, 440, 540 is a multi-part shaft including a first section 342, 442, 542 and a second section 344, 444, 544 joined at a shaft joint 346, 446, 546. In the exemplary embodiments of FIGS. 3A, 3B and 3C, the portion of the static support structure 370, 470, 570 within the transitional duct 304, 404, 504 does not include a flow correcting vane structure. Furthermore, the transitional ducts 304, 404, 504 do not include any flow correcting vanes. In order to maintain the relative positions of the first shaft 330, 430, 530 and the second shaft 340, 440, 540 and support the rotors in the first turbine section 310, 410, 510, a bearing 350, 450, 550 is placed between the shafts and contacts both shafts 330, 340, 430, 440, 530, 540 thereby transmitting radial load from one rotor to another.

Figure 3A:
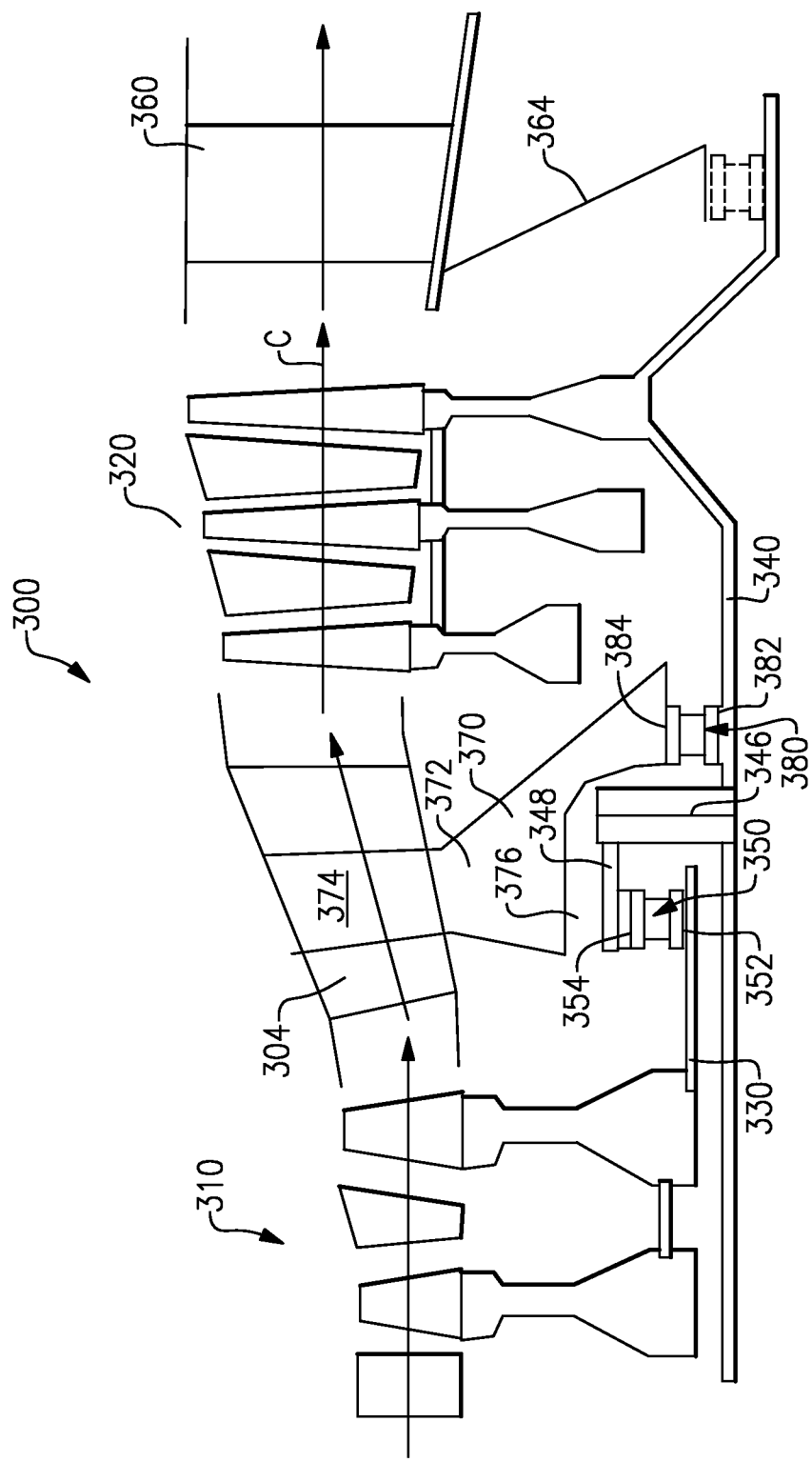
FIG. 3A schematically illustrates a first example turbine portion including a static support structure between a first turbine portion and a second turbine portion.
Figure 3B:
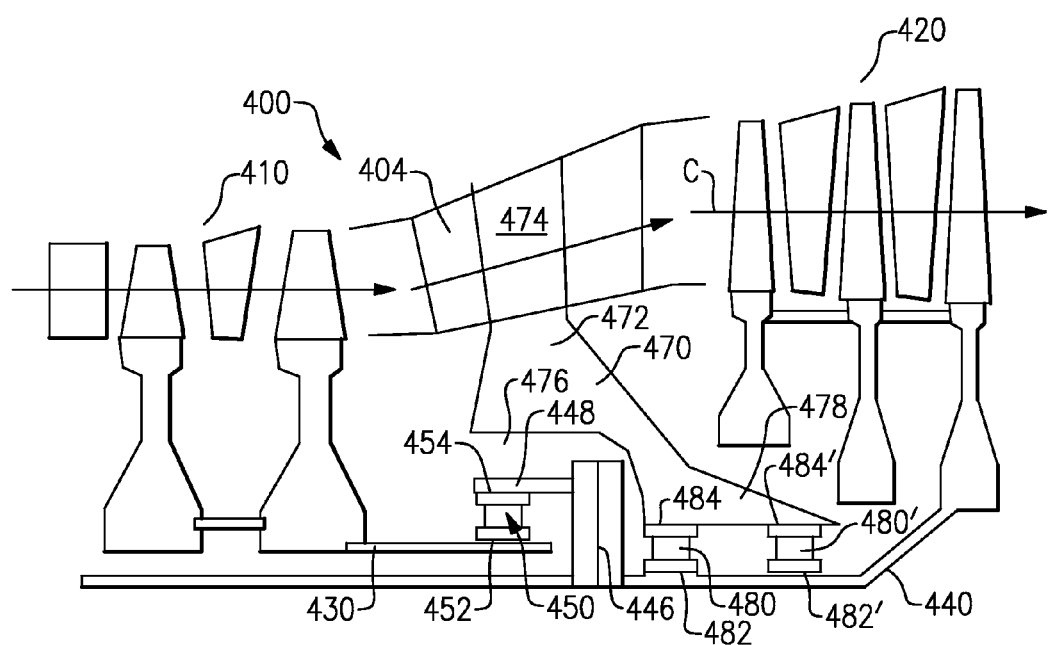
FIG. 3B schematically illustrates a second example turbine portion including a static support structure between a first turbine portion and a second turbine portion.
Figure 3C:
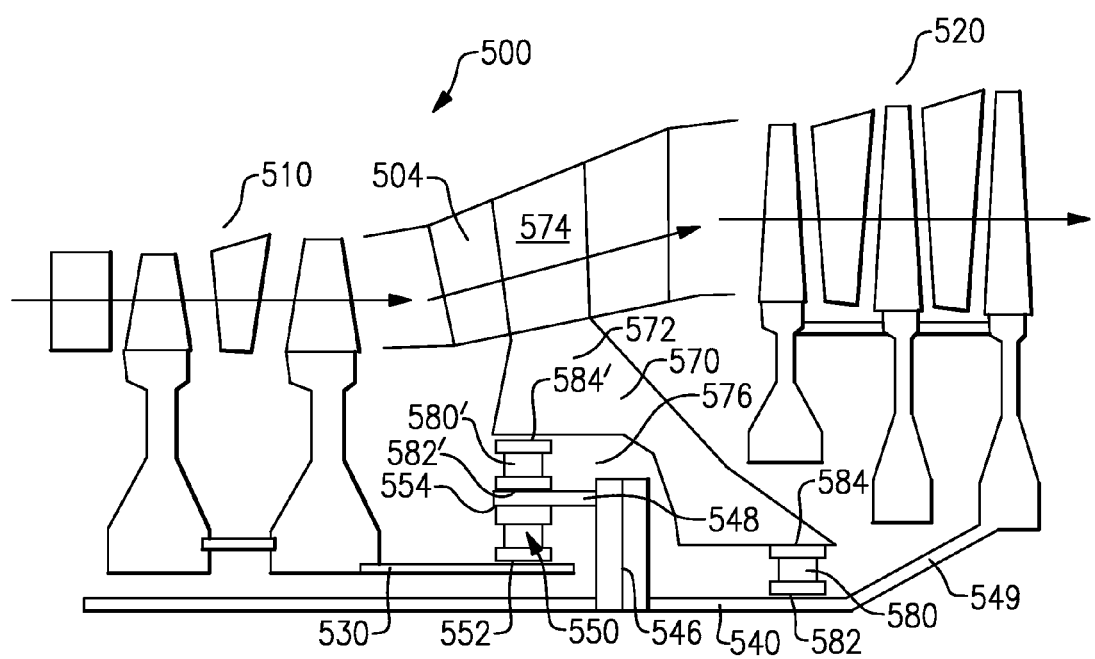
FIG. 3C schematically illustrates a third example turbine portion including a static support structure between a first turbine portion and a second turbine portion.

Each of the example turbine portions 300, 400, 500 of FIGS. 3A, 3B and 3C utilize the above described bearing 352, 452, 552 arrangement to provide the structural support to the first shaft 330, 430, 530 and the rotors connected to the first shaft 330, 430, 530, the inner diameter of the bearing 352, 452, 552 is connected to the first shaft 330, 430, 530 and the outer diameter 3534, 454, 554 of the bearing 352, 452, 552 is connected to an extension hub 348, 448, 548 extending from the joint 346, 446, 546 of the second shaft 340, 540, 440.

The example turbine portions 300, 400, 500 of FIGS. 3A-3C provide additional structural support to the outer diameter of the primary flowpath and the engine case via the inclusion of the above described static support structure 370, 470, 570. The static support structure 370, 470, 570 includes a first portion inner housing 372, 472, 572 radially inward of the primary flowpath C and a second portion strut 374 extending through the primary flowpath C. The static support structure 370, 470, 570 is connected to an outer diameter of the primary flowpath C at a radially outward end of the second portion strut 374, 474, 574. The first portion of the static support structure 370, 470, 570 extends radially inward from the primary flowpath C and provides radial support to the second shaft 340, 440, 540 via a bearing 380, 480, 580.

The static support structure 372, 472, 572 supports the second shaft 340, 440, 540 via the bearing 380, 480, 580. The static support structure 372, 472, is connected to the second shaft 340, 440, 540 at an inner diameter 382, 482, 582 of the bearing 380, 480, 580 and to the first portion 372, 472, 572 of the static support structure 370, 470, 570 at an outer diameter 384, 484, 584 of the bearing 380, 480, 580.

In order to accommodate the bearing 350, 450, 550 connecting the first shaft 330, 430, 530 to the second shaft 340, 440, 540 the second portion 372, 472, 572 of the static support structure 370, 470, 570 includes a radially stepped housing feature 376, 476, 576. The radially stepped housing 376, 476, 576 is positioned immediately radially outward of the extension 348, 448, 548 extending from the joint 346, 446, 546.

Referring specifically to the example of FIG. 3A, the static support structure 370 is supported, relative to the second shaft 340, via a single bearing 380. A turbine exhaust case extension 360 is positioned at an exhaust exit of the second turbine section 320. The turbine exhaust case extension 360 is supported relative to the second shaft 340 in the illustrated example via a bearing 362 and a turbine exhaust case support wall 364. In alternate example engines, the turbine rotor 320 is sufficiently light or sufficiently short that the support wall 364 and the bearing 362 can be omitted. In alternate examples, such as those depicted in FIGS. 3B and 3C, the turbine exhaust case 360 can be omitted.

Referring again to FIGS. 3A, 3B and 3C, in some example engines the primary flowpath C and the engine case cannot be adequately supported relative to the second shaft 340, 440, 540 by a single bearing 380, 480, 580. In these examples, an additional bearing is included and connects the static support structure 370, 470, 570 to the second shaft 340, 440, 540.

Referring specifically now to the example of FIG. 3B, a second bearing 480' is included for radial support and/or sloe constraint of the turbine 420 and connects the static support structure 470 to the second shaft 440 in a similar manner to the first bearing 480. A bearing connection region 478 of the static support structure 470 is extended axially and is positioned radially inward of the second turbine section 420. In this example, two bearings 480, 480' support the static support structure 470, which in turn supports the primary flowpath C and the engine case.

Referring specifically now to the example of FIG. 3C, the second shaft 340 includes a sloped hub region 549 that decreases the available space for a second bearing 580 aft of the joint 546. In order to accommodate the available axial space, and still incorporate a second bearing 580' supporting the static support structure 570 relative to the second shaft 540, the second bearing 580' is positioned in the radially stepped housing 576 and at least partially axially overlaps with the bearing 550 connecting the first shaft 530 to the second shaft 540. The second bearing 580' is connected to a radially inward facing surface of the overhang notch 576 at the outer diameter 584' of the bearing 580'. The inner diameter 582' of the second bearing 580' is connected to the extension hub 548.

Referring now to the examples of FIGS. 3B and 3C together, the inclusion of the optional second bearing 480', 580' provides increased support to the second shaft 440, 540, the outer diameter of the primary flowpath C, and the engine case.

While each of the examples of 3A, 3B and 3C include a static support structure 372, 472, 572 within the transition duct 304, 404, 504, one of skill in the art having the benefit of this disclosure will understand that in some example gas turbine engines the static support structure can be disposed between stages of the second turbine section 520. Examples utilizing this structure refer to the second turbine section as a "split turbine" and can provide for placement of the static support structure in a cooler environment during operation of the gas turbine engine.

Figure 4A:
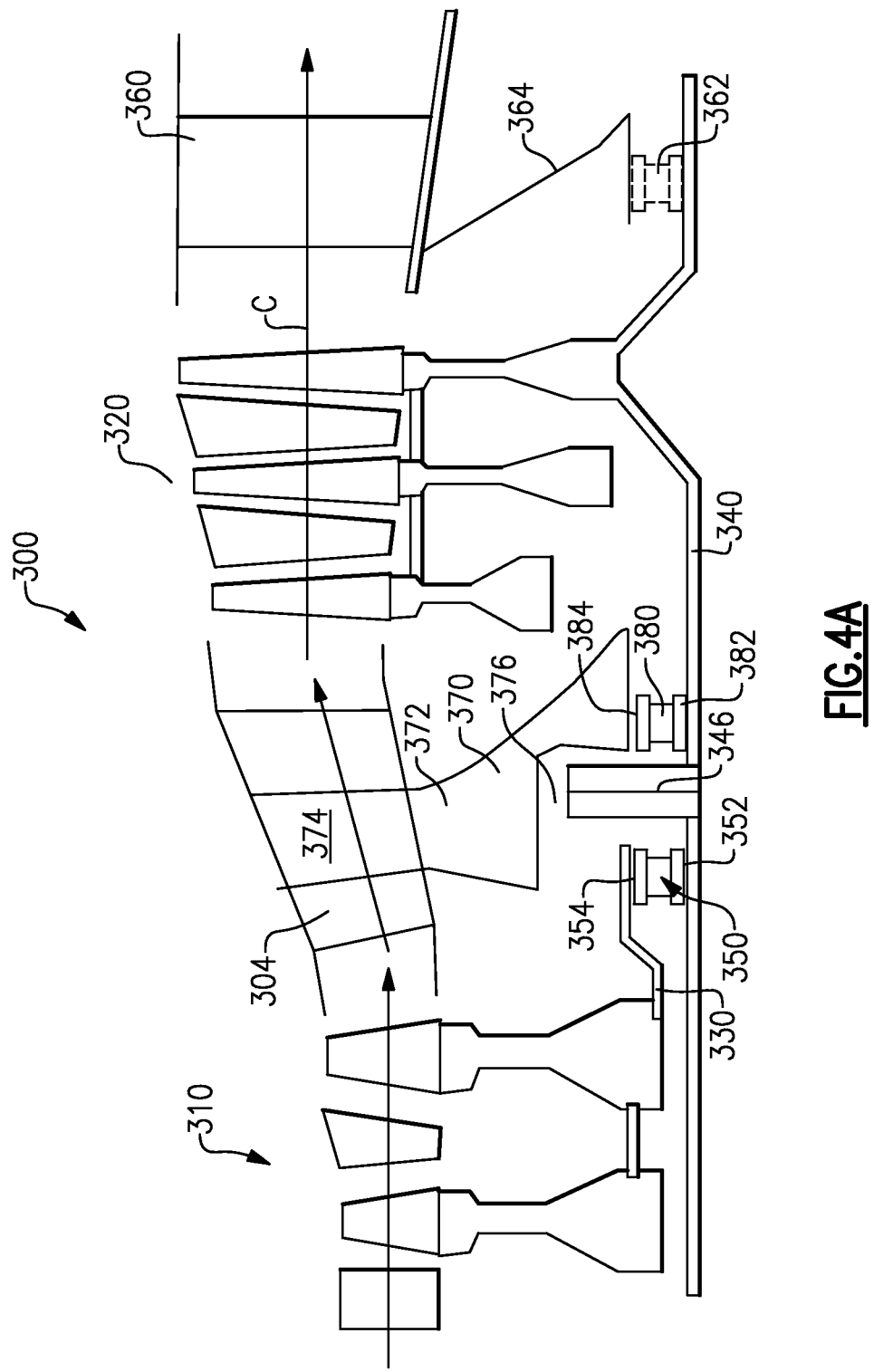
FIG. 4A schematically illustrates a fourth example turbine portion including a static support structure between a first turbine portion and a second turbine portion.
Figure 4B:
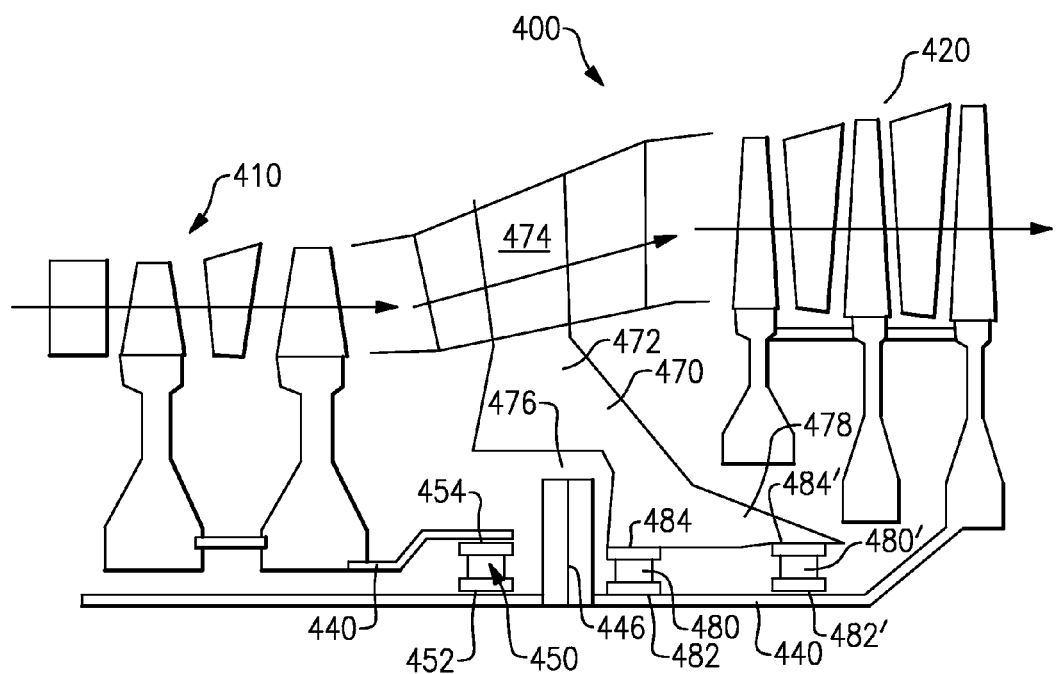
FIG. 4B schematically illustrates a fifth example turbine portion including a static support structure between a first turbine portion and a second turbine portion.

Referring now to FIGS. 4A and 4B, FIGS. 4A and 4B illustrate alternate example bearing configurations for the engines of FIGS. 3A and 3B, with FIG. 4A corresponding to FIG. 3A and FIG. 4B corresponding to FIG. 3B. In both cases, the bearing supporting the first shaft 330, 430 relative to the second shaft 340, 440 is connected to the shafts 330, 340, 430, 440 in the same manner as the bearing 250 illustrated in FIG. 2B. As with the example of FIG. 2B, the bearing configuration illustrated in FIGS. 4A and 4B eliminates the need for an extension hub 148 (illustrated in FIG. 2A). As no extension is included at the joint in the second shaft 340, 440, the static support structure bearing configuration of FIG. 3C is not utilized with this shaft bearing support system. In all other aspects, the example illustrated in FIG. 4A is identical to the example illustrated in FIG. 3A and the example illustrated in FIG. 4B is identical to the example illustrated in FIG. 3B.

While each of the above examples is illustrated independently, one of skill in the art having the benefit of this disclosure will understand that the features can be combined in any combination of the above descriptions and still fall within the instant disclosure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor portion;
a combustor fluidly connected to the compressor portion via a primary flowpath;
a turbine portion fluidly connected to the combustor via the primary flowpath, wherein the turbine portion includes at least a first turbine section and a second turbine section, the second turbine section being at a low pressure relative to the first turbine section;
a first shaft connected to said first turbine section;
a second shaft radially inward of said first shaft and connected to said second turbine section;
wherein the first shaft is supported relative to the second shaft by a first bearing, the first bearing having an inner diameter and an outer diameter, with the inner diameter of the first bearing being connected to the first shaft and the outer diameter of the first bearing being connected to the second shaft; and
a static support structure disposed partially within a transitional duct in said primary flowpath between said first turbine section and said second turbine section, wherein said static support structure structurally supports an outer diameter of the primary flowpath relative to said second shaft, wherein the static support structure is connected to the second shaft via a second bearing, and includes an overhang region positioned radially outward of the first bearing, the static support structure being further supported relative to the second shaft by a third bearing connecting a radially inward facing surface of the overhang region to an extension arm of said second shaft.

2. The gas turbine engine of claim 1, wherein the outer diameter of the first bearing is connected to an extension arm of the second shaft, and the inner diameter of the first bearing is directly connected to the first shaft.

3. The gas turbine engine of claim 1, wherein the first bearing and the third bearing at least partially axially overlap.

4. The gas turbine engine of claim 1, wherein the turbine portion is characterized by a lack of flow correcting vanes in a transitional duct connecting the first turbine section and the second turbine section.

5. The gas turbine engine of claim 1, wherein the first turbine section includes a plurality of turbine rotors, and wherein each of said plurality of turbine rotors is supported relative to said second shaft via said first bearing, through said first shaft.

6. The gas turbine engine of claim 1, wherein the second shaft is a multi-part shaft having a first shaft portion and a second shaft portion, the first shaft portion and the second shaft portion being joined at a shaft joint, and wherein the shaft joint is at least partially axially overlapped by the static support structure.

7. The gas turbine engine of claim 2, wherein the extension arm extends axially from a shaft joint.

8. The gas turbine engine of claim 7, wherein the extension arm extends axially from a radially outward end of the shaft joint.

9. The gas turbine engine of claim 1, wherein the static support structure comprises a first portion inner housing radially inward of the primary flowpath and a second portion strut extending through the primary flowpath.

10. The gas turbine engine of claim 9, wherein the second portion strut is disposed in a transition duct of the primary flowpath.

11. The gas turbine engine of claim 10, wherein the second portion strut is a non-flow correcting strut.

12. A gas turbine engine comprising:
a compressor portion;
a combustor fluidly connected to the compressor portion via a primary flowpath;
a turbine portion fluidly connected to the combustor via the primary flowpath, wherein the turbine portion includes at least a first turbine section and a second turbine section, the second turbine section being at a low pressure relative to the first turbine section;
a first shaft connected to said first turbine section;
a second shaft radially inward of said first shaft and connected to and structurally supporting said second turbine section;
wherein the second shaft is a multi-part shaft having a first shaft portion and a second shaft portion, the first shaft portion and the second shaft portion being joined at a shaft joint;
a static support structure disposed partially within a transitional duct in said primary flowpath between said first turbine section and said second turbine section, wherein said static support structure structurally supports an outer diameter of the primary flowpath relative to said second shaft, and wherein said static support structure at least partially axially overlaps the shaft joint; and
the first shaft is supported relative to the second shaft by a first bearing, the first bearing having an inner diameter and an outer diameter, with the inner diameter of the first bearing being connected to one of the first shaft and the second shaft and the outer diameter of the first bearing being connected to the other of the first shaft and the second shaft, wherein the static support structure is connected to the second shaft via a second bearing, and includes an overhang region positioned radially outward of the first bearing, the static support structure being further supported relative to the second shaft by a third bearing connecting a radially inward facing surface of the overhang region to an extension arm of said second shaft.

* * * * *